United States Patent [19]

Jeindl

[11] Patent Number: 4,679,608
[45] Date of Patent: Jul. 14, 1987

[54] VEHICLE TIRE CHAIN

[75] Inventor: Ferdinand Jeindl, Graz, Austria

[73] Assignee: Steirische Kettenfabriken Pengg-Walenta KG, Graz, Austria

[21] Appl. No.: 693,685

[22] Filed: Jan. 22, 1985

[30] Foreign Application Priority Data

Jan. 20, 1984 [DE] Fed. Rep. of Germany ....... 3401971

[51] Int. Cl.$^4$ ............................................. B60C 27/12
[52] U.S. Cl. ............................... 152/213 A; 24/68 TT; 24/299; 24/301; 81/15.8; 152/219; 152/242
[58] Field of Search ............... 152/231, 239, 241, 242, 152/213 R, 217, 213 A, 218, 219, 220; 81/15.8; 24/68 TT, 116 R, 298-301, 230.5 R, 230.5 W, 231, 237

[56] References Cited

U.S. PATENT DOCUMENTS

| | | | |
|---|---|---|---|
| 1,358,391 | 11/1920 | Pendleton | 152/242 |
| 1,417,560 | 5/1922 | Pendleton | 152/213 R |
| 1,567,621 | 12/1925 | Salsburg | 81/15.8 |
| 1,600,678 | 9/1926 | Kistinger | 152/219 X |
| 2,316,718 | 4/1943 | Royer | 152/219 X |
| 2,328,808 | 9/1943 | Holtz | 152/219 X |

Primary Examiner—Donald E. Czaja
Assistant Examiner—Thomas Bokan
Attorney, Agent, or Firm—Spencer & Frank

[57] ABSTRACT

A vehicle tire chain has an openable and closable inner and outer support engaging, in a mounted state of the chain, respective inner and outer sides of a vehicle tire, a plurality of runner chains each secured to the inner and outer supports and straddling, in the mounted state of the chain, a running face of the tire. The outer support has a first part supporting the runner chains jointly with the inner support and a deflecting member secured to an end of the first part. The outer support further has a second part including a closing linkage for closing the first part under tension. The closing linkage has a first end secured to another end of the first part, a second end passed through the deflecting member and a hook secured to said second end of the closing linkage and releasably attached to the first part of the outer support in the mounted state of the chain. The closing linkage is deflected by more than 90° by the deflecting member. The closing linkage further has an elastic tensioning member having a resilient path of expansion in excess of 100 mm.

16 Claims, 12 Drawing Figures

FIG. 5
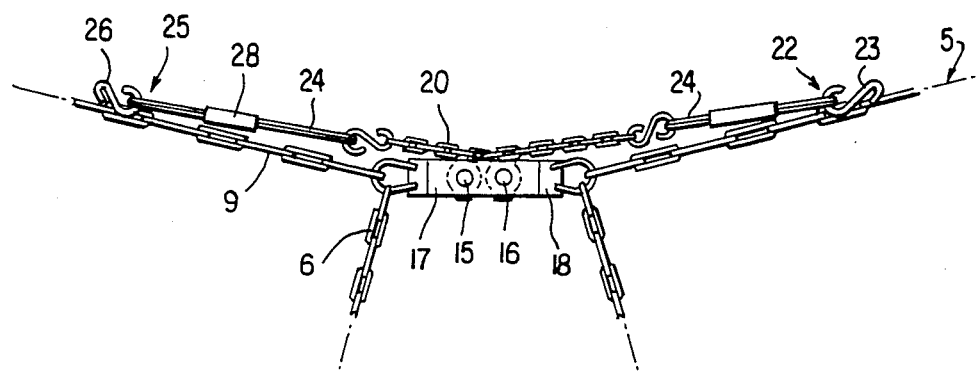
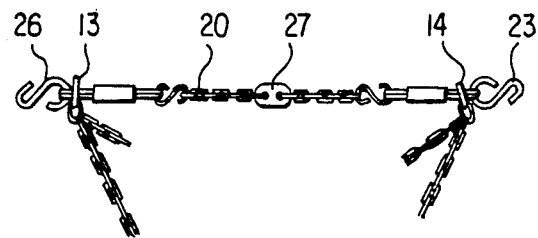
FIG. 6

VEHICLE TIRE CHAIN

BACKGROUND OF THE INVENTION

This invention relates to a chain for vehicle tires and is of the type which, in the mounted state, has an inner and an outer support lying against the inside and the outside of the tire, respectively, and spaced transverse runner chains straddling the running face of the tire and being secured to the inner and outer supports. Both the inner and the outer supports may be opened and closed.

A great number of the above-outlined known tire chains has an inner support constituted by a support ring made of a spring steel wire which may be closed by means of a tensioning chain guided in a pulley block-like arrangement. The tensioning chain is passed across the running face of the tire forwardly to the outer support and closed together therewith.

In other known tire chains of the above type, the inner support constituted by a support ring made of spring steel wire has a hook connection which may be closed or opened in a simple manner. Independently from such a closed device of the inner support, for the outer support a separate tensioning chain is provided which connects the open ends of the outer support, formed, for example, as a lateral chain. After a few yards of displacement of the vehicle, the tensioning chain has to be retightened because the runner chains assume their position within the contacting ellipse (that is, the engagement area between tire and road) only after several rotations of the tire.

It is thus a disadvantage of all known tire chains, that subsequently to their mounting on the tires, the vehicle has to be driven a few yards in order to ensure that the tire chain, particularly the runner chains, assume their correct position, and the tensioning chains have to be retightened manually.

SUMMARY OF THE INVENTION

It is an object of the invention to provide an improved tire chain of the above-outlined type which effects retightening automatically as soon as the vehicle is set in motion, thus eliminating the necessity of manually retightening the chain after moving the vehicle.

This object and others to become apparent as the specification progresses, are accomplished by the invention, according to which, briefly stated, the tire chain has an openable and closable inner and outer support engaging, in a mounted state of the chain, respective inner and outer sides of a vehicle tire, a plurality of runner chains each secured to the inner and outer supports and straddling, in the mounted state of the chain, a running face of the tire. The outer support has a first part supporting the runner chains jointly with the inner support and a deflecting member secured to an end of the first part. The outer support further has a second part including a closing linkage for closing the first part under tension. The closing linkage has a first end secured to another end of the first part, a second end passed through the deflecting member and a hook secured to said second end of the closing linkage and releasably attached to the first part of the outer support in the mounted state of the chain. The closing linkage is deflected by more than 90° by the deflecting member. The closing linkage further has an elastic tensioning member having a resilient path of expansion in excess of 100 mm.

The above-outlined construction of the outer support provides that a subsequent manual tightening of the installed tire chain is no longer necessary. Thus, after the installation of the tire chain the vehicle need not be stopped and the closing linkage need not be retightened and re-attached to the outer support, since, according to the invention, the tensioning member itself automatically performs the readjustment and retightening of the tire chain.

Advantageously, the outer support may be composed of three parts, wherein the first part, together with the inner support, holds the runner chains, while the second and third parts, each as a closing linkage, closes the outer support under tension such that both closing linkages are secured with one of their ends to a deflecting end of the first part of the outer support. Further, the respective other ends of the second and third parts are hooks which are slidingly passed through the respective adjacent deflecting parts and are deflected more than 90°. Also, the second and third parts (closing linkages) include an elastic tensioning member having a tensioning path (resilient path of expansion or stretch) that is longer than 100 mm.

The arrangement according to the invention of two identically structured closing linkages which are hooked into the outer support while crossing one another has the advantage that the user needs to exert less force to bring about the necessary tension in the tire chain, since each tensioning member, as opposed to the embodiment with a single closing linkage, has to be tensioned only to one half of the required tensioning force, since the latter results from the sum of forces in the two tensioning members.

According to another embodiment of the invention, the closing linkage has two crossed-over free ends which pass slidingly through the deflecting members and are deflected thereby by more than 90°. The free ends cross one another and are secured with hooking members into the outer support. At least one of the free ends includes a tensioning member having a tensioning path which is greater than 100 mm. Advantageously, both free ends of the closing linkage have a tensioning member. This construction of the closing linkage has the advantage that only a single closing linkage is guided through the deflecting parts. Further, the mounting of the tire chain is facilitated due to the mobility of one closing linkage within the deflecting member. Also, this construction has manufacturing advantages.

Expediently, the deflecting parts are constituted by rings and further, the hooking members of the closing linkage are larger in size than the diameter of the rings to thus prevent the closing linkage from slipping out of the outer support which would render the tire chain inoperative.

According to a further feature of the invention, the tensioning members are immediately adjoining the hooking members at the free ends of the closing linkage and may slidingly pass through the deflecting members to enhance the flexibility of the closing linkage thus facilitating the mounting of the tire chain, because the outer support may be opened to a greater extent.

According to a further feature of the invention, the tensioning members are formed of at least one closed ring made of an elastic material. The ring or rings are held together by a surrounding sleeve to ensure that they may readily slide through the deflecting members until the hooking members abut the deflecting members.

According to a further advantageous feature of the invention, the closing linkage has, between the deflecting parts and in the middle of its length, a locking member which is of larger size than the diameter of the rings at the end of the outer support. The locking member may be a small tag-like plate carrying identifying inscriptions.

According to a further advantageous feature of the invention, the hooking members have self-closing safety devices, such as spring safety hooks which prevent an accidental unhooking of the free ends of the closing linkage, particularly in response to external forces exerted on the tire chain during vehicle travel.

BRIEF DESCRIPTION OF THE DRAWINGS

FIG. 5 is a side elevational view of a further preferred embodiment of the invention.

FIG. 6 is an enlarged side elevational view of a component shown in FIG. 1, and illustrated in an open (unattached) state.

DESCRIPTION OF THE PREFERRED EMBODIMENTS

Figure 1:
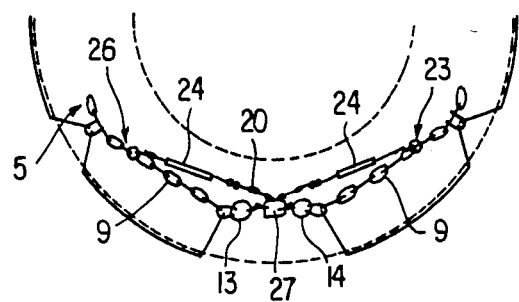
FIG. 1 is a side elevational view of a mounted tire chain according to a preferred embodiment of the invention.
Figure 2:
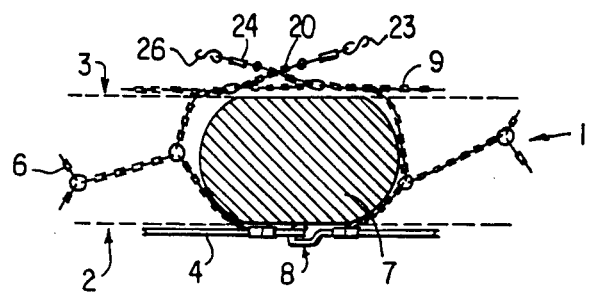
FIG. 2 is a bottom plan view of the structure shown in FIG. 1, also illustrating the contacting ellipse between tire and ground.
Figure 3:
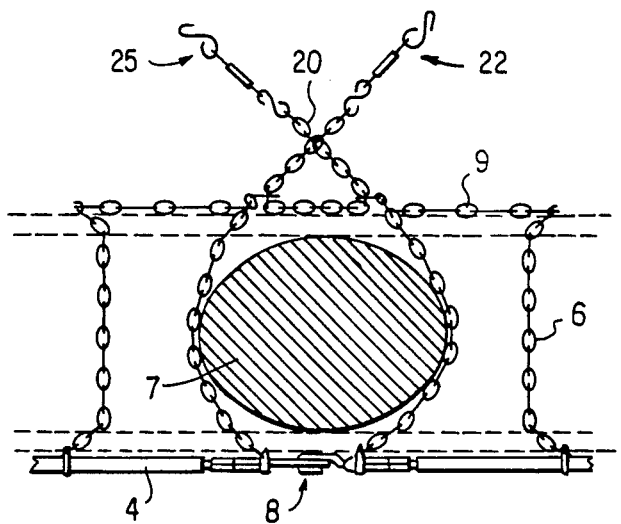
FIG. 3 is a bottom plan view of a mounted tire chain of ladder-like configuration, incorporating the preferred embodiment of the invention.

Turning now to FIGS. 1, 2 and 3, the tire chain 1 essentially comprises an inner support 4 and an outer support 5, lying against the inner and the outer tire sides 2 and 3, respectively. The tire chain further has runner chains 6 which are secured to the inner and outer supports 4 and 5 and which straddle the running face of the tire. Both the inner and the outer supports 4 and 5 may be opened and closed. The inner support 4 is formed of a substantially circular spring steel yoke which is open at one location and which may be closed by means of a hook lock 8.

Figure 4:
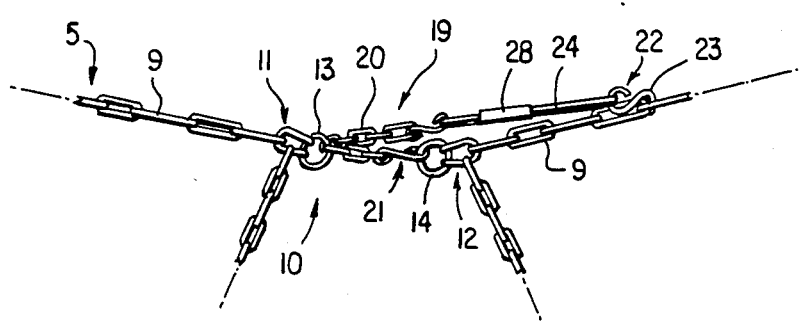
FIG. 4 is a side elevational view of another preferred embodiment.

In the embodiment shown in FIG. 4, the outer support 5 is formed of at least two parts 9 and 19. The first part 9 is formed as a side chain provided with an opening 10. As an alternative shown in FIG. 1d, the first part 9 may be composed of a rigid arcuate yoke 9a and chain parts 9b. Instead of a rigid single-piece arcuate yoke a multipart yoke 9c-9f may be provided, as shown in FIG. 1e. The ends 11 and 12 of the side chain 9 are deflecting rings 13 and 14. The deflecting rings, also shown, for example, in FIG. 1, may be openable members as shown at 13a, 13b of FIG. 1c.

The second part 19 of the outer support 5 is formed as a closing linkage 20 which closes the outer support 5 under tension. For this purpose, as shown in FIG. 4, the closing linkage 20 is secured to the end 12 of the first part 9 of the outer support 5. The closing linkage 20 is, with its second, free end 22 passed through the outer end 11 (deflecting ring 13) of the first part 9 of the outer support 5 and is deflected by the ring 13 at an angle greater than 90°. The end 22 of the closing linkage 20 is secured to the outer support 5 (formed as a side chain) by means of a hook 23. Immediately adjacent the hook 23 a tensioning member 24 is inserted into the closing linkage 20. The tensioning member 24 has a tensioning path greater than 100 mm. As seen in FIG. 1b, the hook may be a self-closing safety hook 23a.

Figure 1A:
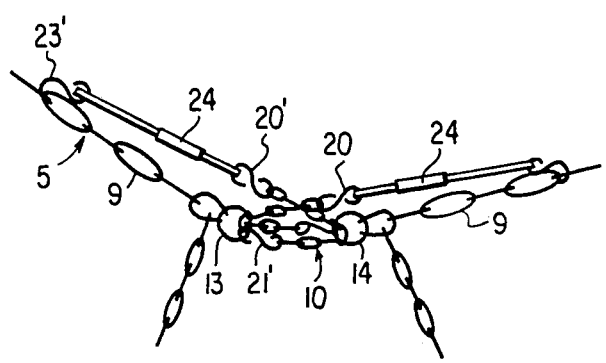
FIG. 1a is a side elevational view of another preferred embodiment.
Figure 1B:
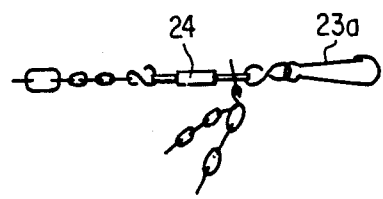
FIG. 1b is a side elevational view of a variant of a component forming a part of the structure of FIG. 1.
Figure 1C:
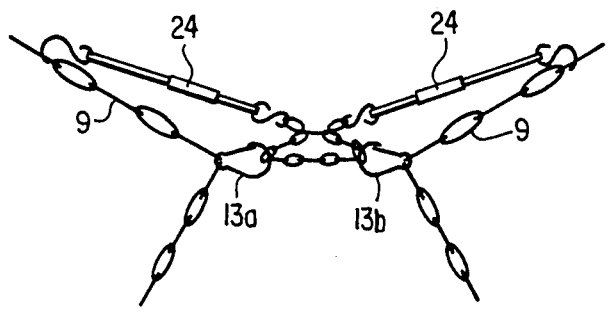
FIG. 1c is a side elevational view of a variant of components forming part of the structure of FIG. 1.
Figure 1D:
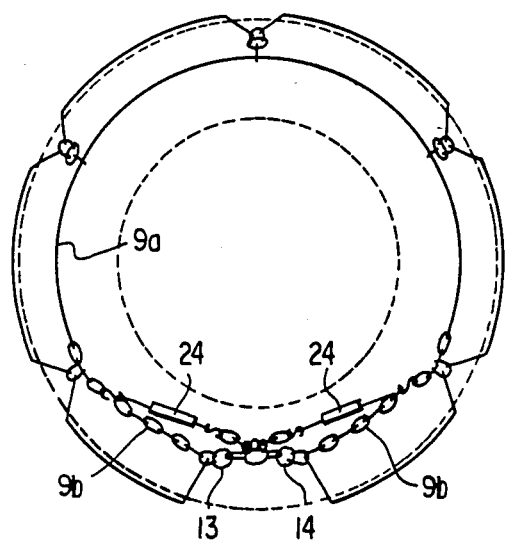
FIG. 1d is a side elevational view of a further preferred embodiment.
Figure 1E:
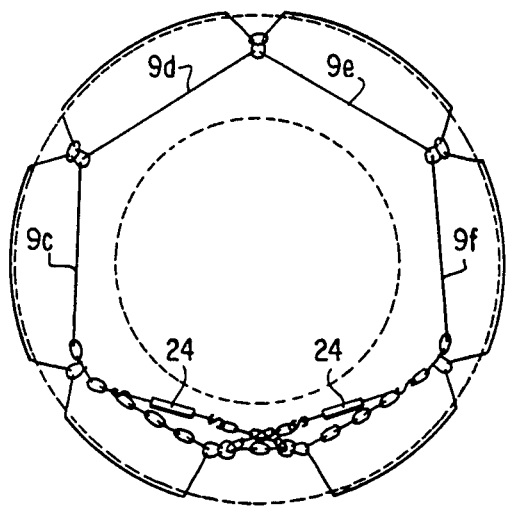
FIG. 1e is a side elevational view of still another preferred embodiment of the invention.

A modification of the FIG. 4 embodiment is shown in FIG. 1a. According to this embodiment two closing linkages 20, 20' cross one another and are secured (hooked) into the oppositely lying outer support 5. In such a case one end of each closing linkage 20, 20' is secured to the respective ring 13, 14, while the other end is slidingly passed through the respective other ring 13 or 14. Stated differently there is provided a second closing linkage 20' whose hook 21' is secured to the deflecting ring 13 and which is slidingly passed through the deflecting ring 14 and then, with another hook 23', the second closing linkage 20' is secured to the first part 9 to the left of the opening 10. The required tension of the snow chain is obtained by two tensioning members 24.

Further embodiments of the invention are illustrated in FIGS. 3 and 5. The tire chain shown therein has a single closing linkage 20 which has two free ends 22 and 25 each having a tensioning member 24 as well as a hook member 23 and 26, respectively, for attachment to the outer support 5.

The closing linkage 20 is slidingly passed through the deflecting rollers 15 and 16, as shown in FIG. 5, or through the deflecting rings 13 and 14, as shown in FIGS. 1, 2, 3 and 6, and in mid-length of the closing linkage 20 a locking member 27 is provided which is greater in size than the diameter of the deflecting parts constituted by rings 13, 14 or rollers 15, 16. By means of this arrangement, the closing linkage 20 which is freely slidable in the deflecting parts (13, 14 or 15, 16) may not slide out therefrom which would render the tire chain inoperative. The hook members 23 and 26 too, have a size so selected that they are prevented from gliding through the deflecting parts 13 and 14, as shown in FIG. 6.

In contradistinction, the tensioning members 24 are so dimensioning that they may just pass through the deflecting parts (rings 13, 14 or rollers 15, 16) in order to achieve an as large an extension (enlargement) of the outer support 5 of the tire chain as possible. For this purpose, the tensioning members 24 each formed preferably of a pair of elastic rings, are held together by a surrounding sleeve 28. The assemblies 24, 28 pass readily through the respective deflecting parts 13, 14 or 15, 16. The hooks 23 and 26 as well as the deflecting rings 13 and 14 may be openable spring safety hooks.

Preferably, the closing linkage is a short-link chain to enhance its sliding properties. Instead of chain links, the closing linkage may be a cable to further increase its sliding properties. It is feasible to construct the outer support as a side chain only in part while the other part is a single-part or multi-part yoke.

Figure 1F:
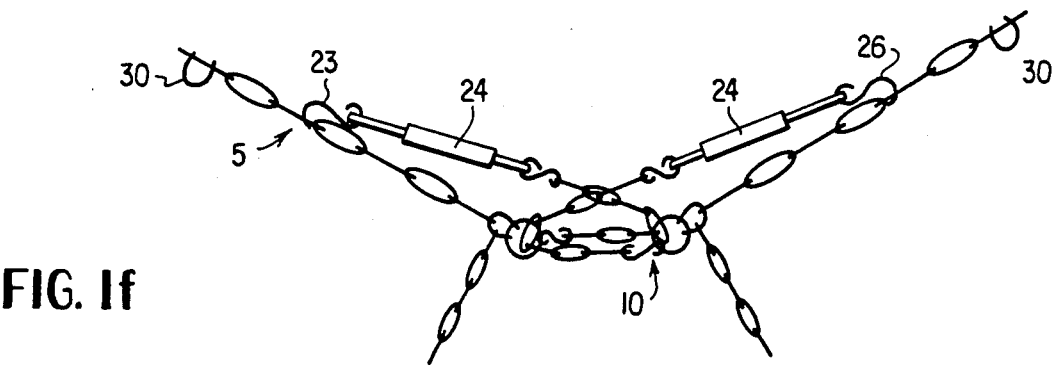
FIG. 1f is a side elevational view of the embodiment of FIG. 1a, illustrating further details.

The handling of the tire chain is facilitated by marking the tensioning members 24 and occasionally also the hook members 23 and 26 with different colors as shown with different cross-hatchings in FIG. 1f. Further, at the outer support 5, to the right and the left from the opening 10, corresponding colored markings 30 and 31 are arranged to indicate to the user the side to which the free ends of the closing linkage should be secured (hooked).

To illustrate how the invention provides for a self-retightening of the chain after it is installed and the vehicle is set in motion the following additional description is given. As shown in FIGS. 2 and 3, the tires of the vehicle contact the road in the area of the so-called "contacting ellipse" 7, which is bigger than the normal space between neighboured runner chains 6 (see FIG. 3). Therefore, the two runner chains being closely situated to this "contacting ellipse" only can assume their correct position after the vehicle has been driven a few yards. This "correction" of the runner chains' position is effected automatically by the elastic tensioning member in connection with the closing linkage, after the tire has been moved a little. In the case where the closing linkage means has an elastic tensioning member situated adjacent the first and second ends thereof each elastic tensioning member exerts a resilient force on both the first and second deflecting members from different directions to expose each deflecting member to two resilient forces from two directions by means of the closing linkage means during the normal operation thereof.

It will be understood that the above description of the present invention is susceptible to various modifications, changes and adaptations, and the same are intended to be comprehended within the meaning and range of equivalents of the appended claims.

What is claimed is:

1. In a vehicle tire chain having a openable and closable inner and outer support engaging, in a mounted state of the chain, respective inner and outer sides of a vehicle tire, a plurality of runner chains each secured to the inner and outer supports and straddling, in the mounted state of the chain, a running face of the tire, the improvement wherein said outer support comprises
   (a) a first part supporting said runner chains jointly with said inner support; said first part having first and second ends situated adjacent one another in the mounted state of the chain;
   (b) first and second deflecting members secured to said first and second ends, respectively of said first part; and
   (c) a second part comprising a closing linkage means for closing said first part under tension in the mounted state of the chain and during normal operation thereof; said closing linkage means including
      (1) opposite first and second ends;
      (2) first and second hooks secured to said first and second ends, respectively, of said closing linkage means and releasably attached to said first part of said outer support in the mounted state of said chain; said closing linkage means being passed glidingly over said first and second deflecting members and being deflected by more than 90° by each of said deflecting members and said closing linkage means having two end portions crossing one another in said mounted state; and
      (3) separate elastic tensioning members situated adjacent said first and second ends of said closing linkage means; each elastic tensioning member exerting a resilient force on both said first and second deflecting members from different directions to expose each deflecting member to two resilient forces from two directions by means of said closing linkage means.

2. A vehicle tire chain as defined in claim 1, wherein said elastic tensioning members are dimensioned for passage through said deflecting members.

3. A vehicle tire chain as defined in claim 1, wherein said hooks have self-closing safety means.

4. A vehicle tire chain as defined in claim 1, wherein said first part of the outer support is a side chain.

5. A vehicle tire chain as defined in claim 1, wherein said first part of said outer support is formed in part of a chain and in part of a rigid yoke.

6. A vehicle tire chain as defined in claim 1 wherein said first part of said outer support comprises a multipart yoke.

7. A vehicle tire chain as defined in claim 1, wherein said elastic tensioning members comprise at least one closed elastic ring.

8. A vehicle tire chain as defined in claim 7, further comprising a sleeve surrounding and holding together said closed elastic ring.

9. A vehicle tire chain as defined in claim 1, wherein said closing linkage means comprises a chain.

10. A vehicle tire chain as defined in claim 9, wherein said chain has short links for facilitating gliding in said deflecting member.

11. A vehicle tire chain as defined in claim 1, wherein said deflecting members are rings.

12. A vehicle tire chain as defined in claim 11, wherein said hooks have a larger size than an inner diameter of said rings for preventing the hooks from passing through said rings.

13. A vehicle tire chain as defined in claim 11, wherein said deflecting members are openable.

14. A vehicle tire chain as defined in claim 1, wherein said closing linkage means comprises, approximately in mid-length thereof, a locking member having a size larger than inner diameters of said deflecting members.

15. A vehicle tire chain as defined in claim 1, wherein said deflecting members are rollers.

16. A vehicle tire chain as defined in claim 1, wherein said first and second hooks carry different color codes and further wherein the first part of the outer support, on either side of said deflecting members, carries different color codes corresponding to those of the first and second hooks.

* * * * *